United States Patent [19]

Melanson

[11] 4,295,666
[45] Oct. 20, 1981

[54] SHROUDED TUBE AND COUPLING THEREFOR

[75] Inventor: Donald G. Melanson, Glastonbury, Conn.

[73] Assignee: United Technologies Corporation, Hartford, Conn.

[21] Appl. No.: 91,680

[22] Filed: Nov. 5, 1979

[51] Int. Cl.³ .............................................. F16L 19/02
[52] U.S. Cl. ...................................... 285/14; 285/55; 285/175; 285/231; 285/357
[58] Field of Search ................. 285/14, 354, 233, 234, 285/49, 347, 332, 332.1, 223, 334.5, 231, 55, 266, 175, 261, 263, 357

[56] References Cited

U.S. PATENT DOCUMENTS

| | | | |
|---|---|---|---|
| 2,560,263 | 7/1951 | Wiegand et al. | 285/354 X |
| 3,747,960 | 7/1973 | Bawa | 285/354 X |
| 3,848,905 | 11/1974 | Hammer et al. | 285/354 |
| 3,913,949 | 10/1975 | Senatro | 285/14 |

FOREIGN PATENT DOCUMENTS

| | | | |
|---|---|---|---|
| 723630 | 11/1966 | Italy | 285/354 |
| 374517 | 2/1964 | Switzerland | 285/223 |

*Primary Examiner*—Dave W. Arola
*Attorney, Agent, or Firm*—Norman Friedland

[57] ABSTRACT

A shrouded tube construction including concentric tubes is attached to a cooperating coupling in such a manner as to prevent leakage from either tube, and to provide a resilient, flexible seal that permits a degree of misalignment and permits use of lighter and less expensive material for the coupling and shorter tubes connected thereby.

3 Claims, 1 Drawing Figure

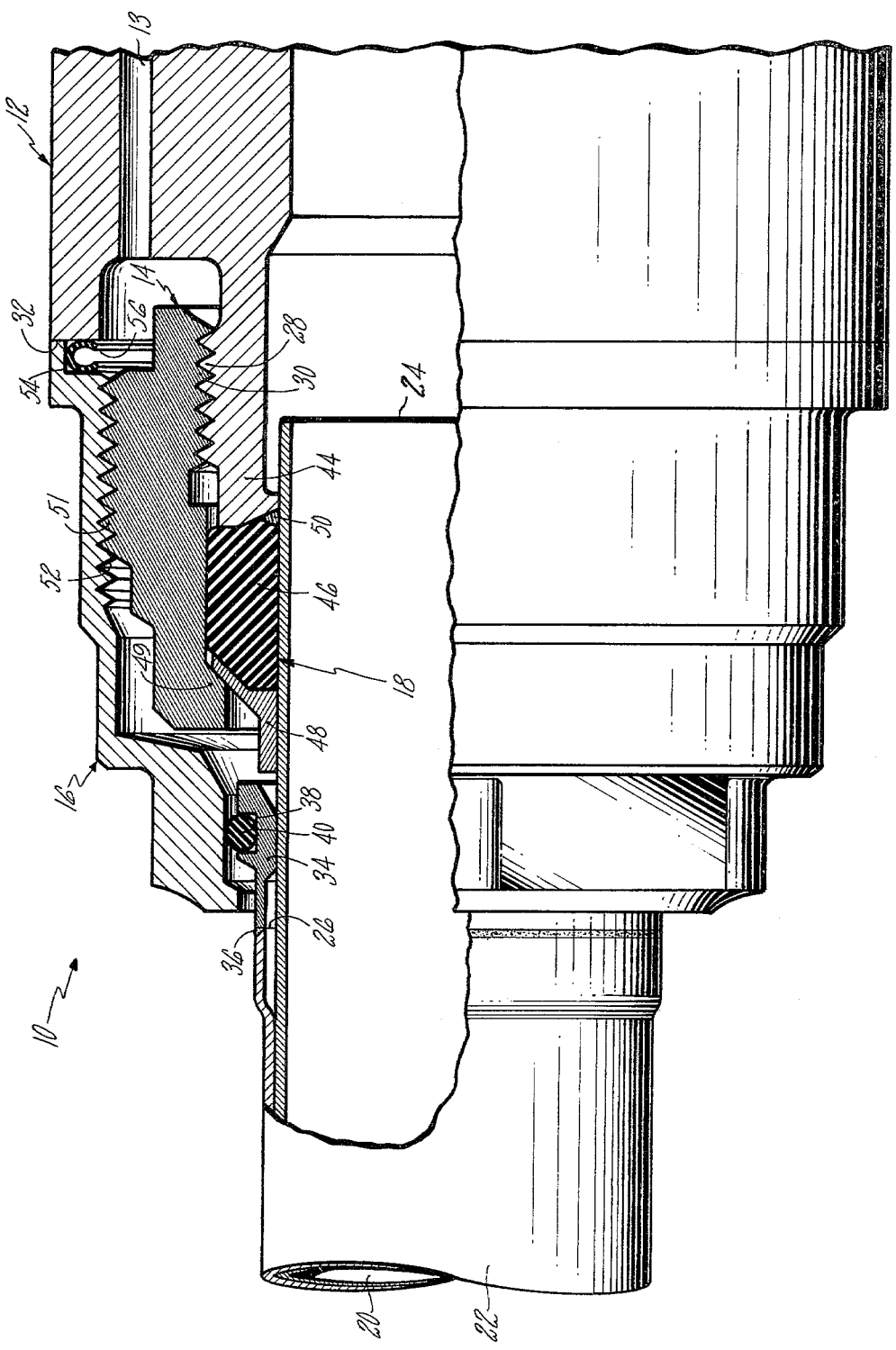

SHROUDED TUBE AND COUPLING THEREFOR

BACKGROUND OF THE INVENTION

This invention relates to connector means for fuel lines of a gas turbine engine and more particularly to coupling means for concentric tubes designed to avoid leakage from either or both of said tubes.

U.S. Pat. No. 3,913,949 granted to C. A. Senatro on Oct. 21, 1975 and assigned to the same assignee as this patent application is exemplary of the coupling means of the present invention which constitutes an improvement thereof and which is incorporated herein by reference. The heretofore known coupling is characterized as having a conical metal-to-metal seal. Inherent in this type of seal is the necessity of applying a high level of torque to achieve a good positive seal from the metal-to-metal surfaces. This prohibits virtually no tolerance in the alignment of components. This inability to provide some misalignment manifests a rigid specification for the fuel carrying concentric tubes which have to either be made longer or require certain bends to avoid the excessive stresses.

I have found that by utilizing a composite rubber compound for the seal and eliminate the conical meta-to-metal sealing surfaces, I can obtain a higher degree of flexibility, allowing shorter tubes and eliminating the necessity of the steel construction of the coupling. This results in a less expensive device requiring less rigid design criteria.

SUMMARY OF THE INVENTION

An object of this invention is to provide an improved coupling for a shrouded tube for a gas turbine engine fuel line.

A feature of this invention is to provide in a coupling as described, a synthetic rubber seal, judiciously located so as to allow flexibility in misalignment tolerance so as to reduce design consideration for the tubes and allow the use of a lighter weight metal, such as aluminum. This reduces the cost of the coupling from the heretofore known coupling.

Other features and advantages will be apparent from the specification and claims and from the accompanying drawings which illustrate an embodiment of the invention.

BRIEF DESCRIPTION OF THE DRAWING

The sole FIGURE is a sectional view taken through the tubes and its coupling.

DESCRIPTION OF THE PREFERRED EMBODIMENT

As is described in U.S. Pat. No. 3,913,949 and shown in the sole FIGURE, the coupling securing the shrouded tube generally illustrated by reference numeral 10 basically comprises four component parts, the attaching coupling 12, the inner nut assembly 14, the outer nut assembly 16 and the seal 18.

Referring to the sole FIGURE, the inner tube 20 is positioned within the outer tube 22 and the end 24 of the inner tube 20 extends beyond the end 26 of the outer tube 22 and slightly into the opening of the attaching coupling 12. The outer coupling 12 to which the tubes are attached has a central passage 13 which is in alignment with the inner tube 20.

The attaching coupling 12 has an external threaded surface 28 for attachment to the inner nut assembly 14 having a complimentary inner threaded surface 30. Adjacent to and concentric to the threaded surface 28 is a shoulder 32 on attaching coupling 12 and is on a larger diameter than surface 28 and is axially spaced in relation thereto.

An outer end member 34 is attached as by a weld 36 to the outer tube 22. This member 34 has a groove 38 in its outer surface and this groove receives an O-ring 40. Adjacent the weld 36 the tube 22 may be expanded, as shown, before attachment of the member 34. Before attachment of the member 34 the outer coupling nut 16 is positioned over the tubes to the left of the member 34.

In accordance with this invention seal 18 is mounted on the end of the inner tube 20 that engages the end of the attaching coupling 12 at the reduced diameter end 44. A seal 18 comprises the rubber composite toroidal shaped member 46 friction fitted to the tube 20 and retained axially by collar 48 that is braised to tube 20 in the position shown. Ferrule or ring 50 made from a suitable plastic material also frictionally fitted on tube 20 serves to keep rubber member 46 from extruding when torqued into sealing engagement. Depending shoulder 49 formed on inner nut 14 when threadably engaging the complimentary threaded surface 30 of attaching coupling 12 pulls the seal assembly 18, (rubber member 46, collar 48 and ferrule 50) into sealing engagement with attaching coupling 12.

The outer coupling nut 16 when in the position shown has an inner threaded surface 52 engaging with the threaded surface 51. Adjacent these threads 52 the nut 16 has a notch 54 to receive a sealing ring which is urged against shoulder 32. Leakage from the space between the tubes is prevented by the seal 56 at this point. Fluid in the space between the tubes may escape between the inner and outer coupling nuts, past the threads between the inner and outer nuts and through a passage 13 in the coupling. This passage, which communicates with the outer surface of the coupling between the inner and outer threaded surfaces may be connected to a drain or to a suitable leak indicator.

With the two sets of threads of different pitch, the inner coupling nut will not be loosened or torqued too highly by the tightening of the outer nut and no specific locking device need be used on the inner threads to keep them securely tight in use. The inner threads are preferably a finer pitch than the outer threads. Lockwiring of the outer coupling nut will assure locking of the inner nut also.

It should be understood that the invention is not limited to the particular embodiments shown and described herein, but that various changes and modifications may be made without departing from the spirit and scope of this novel concept as defined by the following claims.

I claim:

1. A coupling fabricated from aluminum for attaching an inner fuel carrying tube and an outer containment tube, said coupling having an attaching member having a central passage in axial alignment with the opening in the inner fuel carrying tube, a seating surface at the mating end of said attaching member, a concentric threaded surface axially spaced from said seating surface, a flexible rubber composite sealing element, toroidal in shape frictionally fitted on the outer diameter of said inner fuel carrying tube, a collar on said latter mentioned tube axially restraining said sealing element, an inner nut having a concentric threaded surface on its inner diameter and a concentric threaded surface on its outer diameter both of said threaded surfaces being disposed on the end adjacent said concentric threaded surface on said attaching member and said threaded surface on the inner diameter being threadably engageable therewith, an outer nut having a concentric threaded surface on its inner diameter threadably engaging said outer threaded surface of said inner nut, said inner nut having a depending shoulder engageable with said collar for urging said sealing element in sealing engagement with said seating surface and urging the end of said inner tubes into said central passage, said outer diameter of said inner fuel carrying tube and said inner nut upon coupling said outer nut to bear against said attaching member and a ferrule at the end of said sealing element mounted on the end of said inner fuel carrying tube for preventing the rubber composite material from extruding when said sealing element engages said seating surface.

2. A coupling as in claim 1 including an outer end member on said outer tube surrounding said inner tube, an O-ring in a groove formed on the outer surface of said outer end member, said outer nut having a cylindrical surface in sliding and sealing relation with said O-ring.

3. A coupling as in claim 2 including a passage in said attaching member communicating with an internal space defined between said sealing member, said O-ring, said attaching member and said outer nut for venting fluids therefrom.

* * * * *